April 18, 1967  M. LATREILLE ET AL  3,314,106
NECK FORMING DEVICE FOR BLOW MOLDING MACHINE
Filed May 18, 1964  2 Sheets-Sheet 1
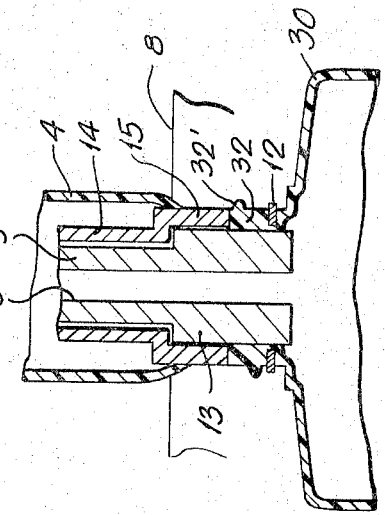
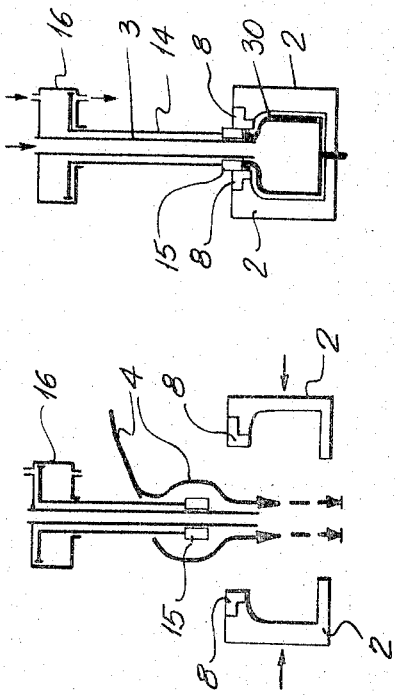
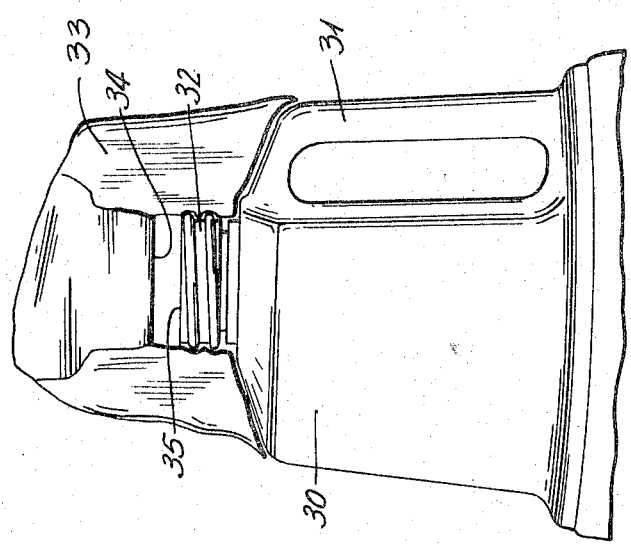
INVENTORS
Marcel POIRIER
Maurice LATREILLE
BY Pierre Lespérance
PATENT AGENT INVENTORS
Marcel POIRIER
Maurice LATREILLE
BY Pierre Lespérance

PATENT AGENT

United States Patent Office 3,314,106
Patented Apr. 18, 1967

3,314,106
NECK FORMING DEVICE FOR BLOW
MOLDING MACHINE
Maurice Latreille, 6855 Place du Roi, Charlesbourg, Quebec, Canada, and Marcel Poirier, 139 Des Peupliers St. E., Quebec, Quebec, Canada
Filed May 18, 1964, Ser. No. 368,209
4 Claims. (Cl. 18—5)

The present invention relates to an apparatus for the manufacture of hollow plastic articles by blow molding and, more particularly, to improvements in the means for forming the neck of a plastic bottle, or other portion of a hollow plastic article requiring a greater thickness than the remainder of said article.

In the blow molding of hollow plastic articles, such as bottles and the like, a parison or tube of hot deformable thermo-plastic material is extruded from a die head between a pair of open half-molds which are then closed over the parison, and air is fed under pressure within the parison to expand the same and apply it against the molding surfaces of the mold halves. After cooling, to allow the plastic to set, the half-molds are opened and the molded article ejected.

It is often necessary to make the walls of some specific portions of the hollow plastic article thicker than the walls of the remaining portions. For example, in a plastic bottle, adapted to be closed by a screw cap, the neck portion has to be made much thicker than the remaining portion of the bottle.

In conventional blow molding machines, the relative thicknesses of the various parts of the hollow article are governed entirely by the ratio of expansion of the parison. Therefore, for example, in order to obtain a minimum thickness for the neck of a bottle, it is often necessary to make the remaining portion of the bottle of a thickness in excess of that which is actually required, resulting in a waste of plastic material.

Moreover, bottles produced in a conventional blow molding machine have to be subjected to an additional finishing operation to smooth out the top edge of the neck or mouth of the bottle for proper fitting of a screw cap. This additional finishing operation naturally increases the cost of manufacturer of the bottles.

The general object of the present invention resides, therefore, in improvements in the means for blow molding hollow plastic articles, which enable to control the thickness of the various wall portions of the hollow article independently of the ratio of expansion of the parison, and which result in a completely finished hollow article requiring no further finishing operation.

A more specific object of the present invention resides in the provision of a blow molding machine provided with means for compression molding a portion of the hollow plastic article made by the machine, said compression molding being effected by displacing a portion of the excess plastic material and impacting the same to form the portion of greatest thickness of the hollow article.

Another object of the present invention resides in the provision of means of the character described, which results in a great saving of plastic material.

The foregoing and other important objects of the present invention will become more apparent during the following disclosure and by referring to the drawings, in which:

FIGURE 1 is a partial elevation of a plastic bottle in the state it is ejected from a blow molding machine provided with the means in accordance with the present invention;

FIGURES 3 and 4 are schematic elevations of the assembly of FIGURE 2, in two stages of its operation; and FIGURE 5 is a partial longitudinal section of the machine of FIGURE 2, in another position of the impactor means.

Figure 2:
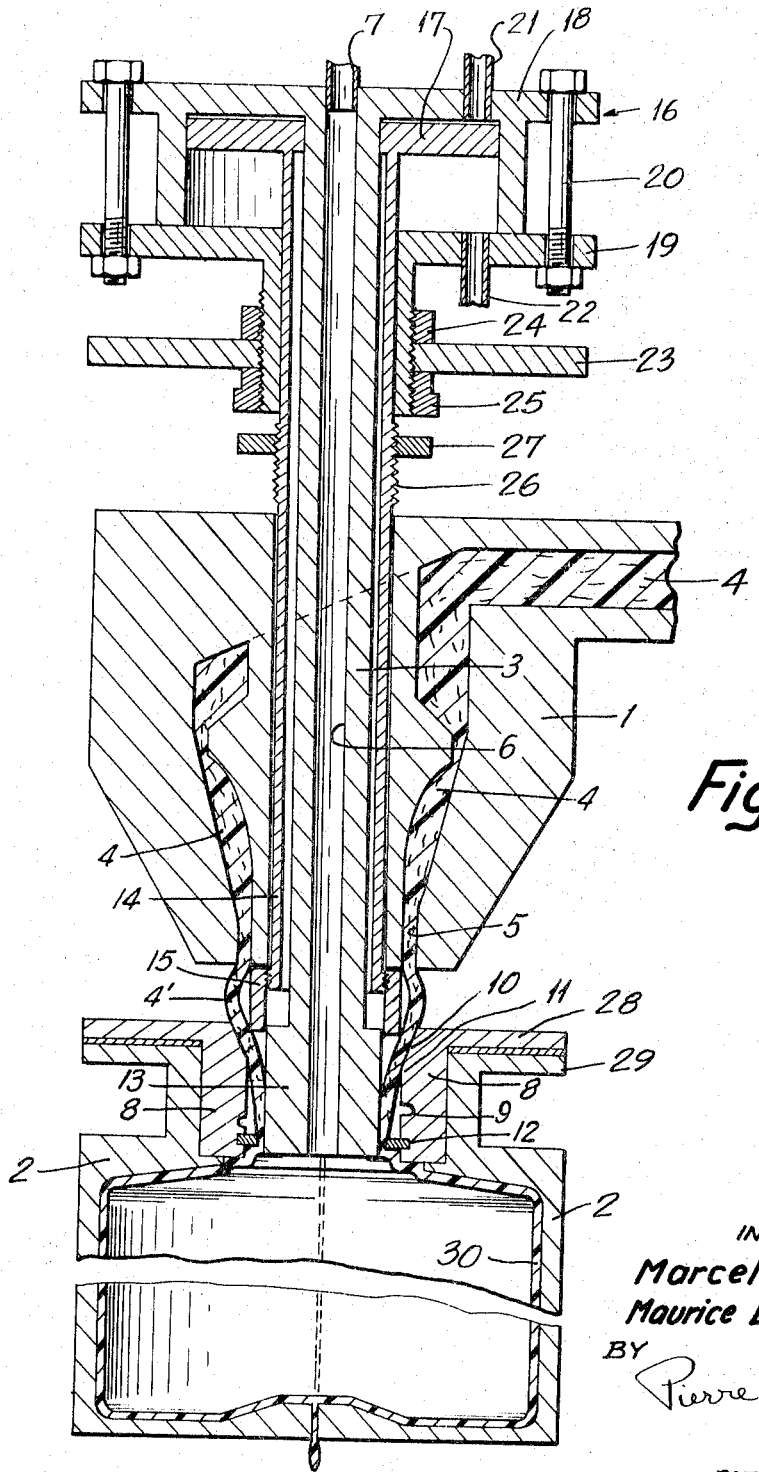
FIGURE 2 is a longitudinal section of a portion of a blow molding machine and showing the impactor means in accordance with the present invention.

Referring now more particularly to the drawings in which like reference characters indicate like elements throughout, the blow molding machine which is modified in accordance with the present invention comprises a die head 1, under which are disposed two mold halves 2 movable transversely to the axis of the die head between closed and open positions, as shown in FIGURES 3 and 4.

A blow pin 3 extends through a bore of the die head and into the mold halves in the closed position of the latter. Blow pin 3 has a through bore 6 connected to air inlet tube 7. Hot thermoplastic material in the deformable state, or extrudate 4, is fed under pressure to head 1 and flows through annular passage 5 of head to be extruded as a parison 4'.

In order to form the neck 32 of a bottle 30 and threads 32' protruding from the outer cylindrical surface thereon, so-called neck forming inserts 8 are removably fitted to the top of the mold halves 2. Each neck insert is adapted to mold one-half portion of the neck 32 of the bottle 30. Said neck inserts are provided on the cylindrical surface thereof with a helical groove 9 to form the helical threads 32' of the neck 32 and their top portion is flared to form a frusto conical surface 10, joining with the cylindrical surface at 11.

The bottom part of each insert 8 is provided with a retaining half ring 12 protruding from the cylindrical surface thereof. In the closed position of the half-molds 2 and inserts 8, the retaining ring 12 is spaced radially outwardly from the enlarged head 13 of the blow pin 3, a distance less than the desired wall thickness of the neck 32 of the bottle 30.

A plunger 14, in the form of a sleeve, surrounds blow pin 3 and is axially movable relative to said blow pin. Plunger 14 is threaded at its lower end for fitting thereon an impactor sleeve 15, which is adapted to slidably fit on the enlarged head 13 of the blow pin 3. Plunger 14 is actuated by power means consisting of a double-acting air cylinder 16, in which is movable a piston 17 secured to the top end of plunger 14.

Cylinder 16 may consist of two parts, namely: a top part 18 and a bottom part 19, which are secured to each other by means of bolts 20. The top part 18 is provided with a top air inlet 21 and the bottom part 19 is provided with a bottom air inlet 22. The bottom part 19 is provided with a sleeve secured to the frame portion 23 of the blow molding machine by means of nuts 24 and 25 threaded on the sleeve part of the portion 19 of the air cylinder 16.

The plunger 14 between the air cylinder 16 and the die head 1 is provided with a threaded portion 26, on which is adjustably screwed a nut 27 which serves to adjust the downward stroke of the plunger by abutting against the top face of the die head 1 or another fixed abutment member.

The neck inserts 8 are preferably removably secured to the respective mold halves 2 having flanges 28 resting on flanges 29 of the mold halves 2 and secured thereto by screws, bolts, or the like, not shown.

In the upper retracted position of plunger 14, as shown in FIGURE 1, the impactor sleeve 15 has its lower outer edge clearing the parison 4', said outer edge being spaced from the frusto-conical surface 10 of the neck inserts in the closed position of the mold halves 2.

During the downward active stroke of plunger 14, the impactor sleeve 15 engages the parison 4' within neck inserts 8, cuts or shears the same when the outer edge of sleeve 15 moves across zone 11 and rams and compresses the thermoplastic material within the molding zone defined by the outer surface of enlarged head 13 of blow pin 3, the cylindrical surface and grooves 9 of the neck inserts 8, and the retaining half-rings 12.

FIGURE 5 shows the plunger and impactor sleeve in the limit position of their active stroke.

It will be noted that the impactor sleeve 15 has a sliding fit with both the external surface of head 13 and the internal cylindrical surface of the neck inserts 8.

It will be noted also that the end face of impactor sleeve 15 fully molds the top face 35 of the neck 32 of the bottle 30, thereby eliminating any subsequent finishing or facing operation of said top face 35.

FIGURE 1 shows a free space 34 between the excess plastic 33 and the neck 32 of the bottle 30 molded with the machine in accordance with the present invention. This free space 34 is being produced by the fact that the impactor sleeve 15 has moved down a portion of the parison to compact the same and mold the neck 32.

Due to this compression molding operation, the neck 32 may have a thickness of any desired value, which is independent of the original thickness of the parison 4' and, consequently, of the final thickness of the walls of the main body of the bottle 30.

Due to this fact, great savings in plastic material can be obtained; for instance, in the manufacture of a certain type of plastic bottle, a saving of 22% in the weight of plastic material used per bottle, has been obtained with the machine in accordance with the invention, as compared to the conventional machines.

The retaining half-rings 12 prevent the thermoplastic material from flowing into the mold cavity defined by mold halves 2, out of the molding cavity defined by the neck inserts above the retaining ring, during the compression stroke of the impactor sleeve 15.

In the manufacture of a bottle, the mold halves 2 are initially opened and the extrudate 4 is extruded from the die head to form a parison 4' extending below the mold halves, as shown in FIGURE 3, the plunger 14 being in upper retracted position.

The mold halves 2 are closed over the parison; air under pressure is blown within the parison through bore 3 of blow pin 3, to thereby form the main body of the bottle by expanding the parison; and the plunger 14 is actuated by air cylinder 16 to move the impactor sleeve 15 downwardly to form the neck 32 of the bottle.

After suitable cooling which is effected by water, or the like, circulating in passages of the mold halves, not shown, the latter are opened and the bottle is ejected by a suitable device, not shown. The plunger 14 returns in its retracted upper limit position and the machine is ready for making another bottle. After removing by hand, excess material 33 adhering to the bottle at the joint formed by the two half-molds, such as on top of handle 31 and of the bottle body, the bottle is ready for use.

While a preferred embodiment in accordance with the present invention has been illustrated and described, it is understood that various modifications may be resorted to without departing from the spirit and scope of the appended claims.

What we claim is:
1. In a container blowing machine, a blow mold including two complementary mold halves which, when in closed position, define a cavity having the shape of the container to be molded and including an inlet passage formed in said complementary halves and extending to one end wall of said mold, said inlet pasage forming an outer neckmolding surface, said blow mold adapted to receive a tubular parison having a closed end in said mold and extending through said inlet passage beyond the same, a blowing nozzle inserted into said tubular body, said blowing nozzle having an inner neck molding surface disposed in said inlet passage opposite said outer neck molding surface and spaced radially inwardly therefrom, said inlet passage having a radially inwardly protruding annular boss disposed at the end of said neck forming surface adjacent said mold cavity said boss extending in the molding space betwen said inner and outer molding surfaces, but terminating short of said inner molding surface, so as to leave an annular passage between said boss and said blowing nozzle, a sleeve-like plunger axially movable along said blowing nozzle and surrounding the same and having an outer end portion having a sliding fit with both said inner and outer molding surfaces, and power means to move said sleeve-like plunger between a retracted position outwardly of said inlet passage and clearing said tubular parison and an active position within said molding space but terminating short of said annular boss, said plunger during its active stroke from said retracted position to said active position cutting the tubular parison, engaging the portion of said parison in said molding space and ramming and upsetting the same between said inner and outer molding surfaces and against said annular boss, to thereby form a container neck by compression molding, said annular boss preventing the flow of said parison into said mold cavity during said active stroke of said plunger, while allowing said neck to remain connected to the remaining portion of the tubular parison in said mold cavity.

2. In a container blowing machine as claimed in claim 1, further including an annular extruding nozzle for extruding said tubular parison spacedly surrounding both said nozzle and said sleeve-like plunger.

3. In a container blowing machine as claimed in claim 2, wherein the portion of said inlet passage adjacent said end wall forms a frusto-conical surface, the outer end of said plunger having its peripheral edge engageable during its active stroke with said tubular parison at the junction of said frusto-conical surface with said outer molding surface of said inlet passage for cutting off said tubular parison at the entrance of said inlet passage.

4. In a container blowing machine as claimed in claim 1, further including abutment means to adjust the active position of said plunger.

References Cited by the Examiner
UNITED STATES PATENTS

| 3,009,196 | 11/1961 | Hagen | 18—5 XR |
| 3,209,401 | 10/1965 | Mehnert | 18—5 |
| 3,224,038 | 12/1965 | Budesheim | 18—5 |

J. SPENCER OVERHOLSER, *Primary Examiner.*

WILBUR L. McBAY, *Assistant Examiner.*